UNITED STATES PATENT OFFICE.

FERDINAND A. LOBERT, OF NATIONAL CITY, CALIFORNIA.

COMPOSITION OF MATTER.

No. 858,084.     Specification of Letters Patent.     Patented June 25, 1907.

Application filed July 12, 1906. Serial No. 325,942.

*To all whom it may concern:*

Be it known that I, FERDINAND A. LOBERT, a citizen of the United States, residing at National City, in the county of San Diego and State of California, have invented certain new and useful Improvements in Composition of Matter; and I do declare the following to be a full, clear, and exact description of the invention, such as will enable others skilled in the art to which it appertains to make and use the same.

This invention is a composition of matter, from which non-corrosive pipes, receptacles and other gas or liquid containers may be made.

My composition consists of the following ingredients combined in the proportions stated, namely, viz: brimstone, one pound; asbestos, 1/2 pound; charcoal, 1/16 pound; graphite, 1/8 pound; carbonate of lime, 1/4 pound. These ingredients are to be thoroughly mingled by agitation in a suitable receptacle over a fire, and the composition is then molded into suitable shapes according to the article desired. Pipes, receptacles or other containers made from this composition will not be affected by sulfuric acid or any other acid or gas.

I claim:—

The composition of matter consisting of brimstone, asbestos, charcoal, graphite and carbonate of lime, substantially in the proportions described and united together by heat and stirring.

In testimony whereof I have hereunto set my hand in presence of two subscribing witnesses.

FERDINAND A. LOBERT.

Witnesses:
GEO. W. BEERMAKER,
FRANK A. KIMBALL.